United States Patent [19]

Abegglen

[11] Patent Number: 4,588,470

[45] Date of Patent: May 13, 1986

[54] APPARATUS FOR APPLYING ADHESIVE TO STACKED SHEETS IN BOOKBINDING MACHINES

[75] Inventor: Heinz Abegglen, Frauenfeld, Switzerland

[73] Assignee: Grapha-Holding AG, Hergiswil, Switzerland

[21] Appl. No.: 672,105

[22] Filed: Nov. 15, 1984

[30] Foreign Application Priority Data

Nov. 22, 1983 [CH] Switzerland ........................ 6261/83

[51] Int. Cl.[4] ................................................ B32B 5/18

[52] U.S. Cl. .................................... 156/578; 118/259; 118/261; 156/78; 156/908

[58] Field of Search ............................... 156/578, 908; 118/258-262; 156/78

[56] References Cited

U.S. PATENT DOCUMENTS

| | | | |
|---|---|---|---|
| 2,649,758 | 8/1953 | Cowgill | 118/259 |
| 3,589,332 | 6/1971 | Dinse | 118/259 X |
| 4,059,714 | 11/1977 | Scholl et al. | 156/78 X |
| 4,259,402 | 3/1981 | Cobbs et al. | 156/78 X |

*Primary Examiner*—David Simmons

*Attorney, Agent, or Firm*—Peter K. Kontler

[57] ABSTRACT

Stacks of paper sheets are transported at a level above a heated paste tank and their lower edge faces are contacted by the upper portion of the peripheral surface of a driven wheel-shaped applicator whose lower portion dips into the supply of paste in the tank and an intermediate portion of which is located above the upper level of the supply of paste and upstream of the upper portion. The intermediate portion of the peripheral surface receives a mixture of paste and air from a spray nozzle which, in turn, receives the mixture from a conduit containing a mixer and a pump and having an intake end immersed in the supply of paste in the tank. The pump draws air or another gas into the conduit by way of a pipe upstream of the mixer, and the latter converts the supplied paste and gaseous fluid into a foam which is delivered to the orifice of the nozzle. The nozzle is preceded by a first doctor which removes paste from the peripheral surface of the applicator ahead of the location where the foam is sprayed by the nozzle, and the nozzle is followed by a second doctor which regulates the thickness of the sprayed-on layer of paste on the applicator.

19 Claims, 2 Drawing Figures

APPARATUS FOR APPLYING ADHESIVE TO STACKED SHEETS IN BOOKBINDING MACHINES

BACKGROUND OF THE INVENTION

The present invention relates to apparatus for dispensing and applying adhesives in general, and more particularly to improvements in apparatus which can be utilized with advantage for the application of adhesive to the backs of signatures or like accumulations of paper sheets or the like in bookbinding machines preparatory to bonding of covers thereto. Still more particularly, the invention relates to improvements in apparatus wherein the commodities, selected portions of which are to be provided with layers of adhesive, are preferably transported by a conveyor having pairs of gripping devices which move along an endless path and serve to advance the commodities along an adhesive applying station. The station normally accommodates a vessel, e.g., a conventional paste tank, wherein the upper level of the supply of confined adhesive is preferably maintained within a predetermined range of levels.

U.S. Pat. No. 4,059,714 discloses an apparatus wherein heated adhesive is foamed prior to the application to selected portions of stacked paper sheets or the like. The apparatus comprises means for admitting an inert gaseous fluid at elevated pressure into a supply of adhesive so that the admitted gas and the adhesive form a foam whose gaseous fraction is permitted to escape during application of the foam to commodities at atmospheric pressure.

German Offenlegungsschrift No. 29 04 097 also discloses an apparatus which serves to apply heated and foamed adhesive to the backs of stacked sheets in a bookbinding machine. The apparatus of this German publication employs a spray nozzle which discharges foamed adhesive against the selected portions of successive stacks. This apparatus exhibits several drawbacks, primarily because it cannot prevent contamination of those portions of commodities which are not to be contacted by adhesive, especially if the thickness of a series of commodities is less than the thickness of the previously treated commodities. In a bookbinding machine, the thickness of paper stacks which are to be provided with covers can fluctuate within a very wide range (e.g., between 3 mm and 80 mm). When the thickness of the next-following stacks is less than that of the preceding stacks, the nozzle is likely to spray adhesive not only against a selected edge face of each stack but also against the sides of the stacks with attendant contamination of the stacks and other problems during further processing. In order to avoid contamination and other inconveniences, the apparatus of the German publication must be furnished with a set of nozzles each of which is designed to discharge a spray of given width. Thus, the operation of the machine must be interrupted for extended intervals of time whenever the machine is to shift from the making of thicker books to the making of thinner books or vice versa with attendant substantial losses in output. Droplets of adhesive which miss their mark (i.e., which fail to land upon the selected edge faces of the commodities) are also likely to contaminate the gripping devices of the transporting means, even if the nozzle is exchanged whenever the machine is to turn out products whose thickness deviates from that of the previously treated products. Deposition of adhesive on the surfaces of the gripping devices interferes with proper disengagement of commodities from such gripping devices downstream of the adhesive applying station and entails further contamination of such commodities.

Another drawback of presently known adhesive applying apparatus which are designed to apply a foamed adhesive is that the foaming or the defoaming operation often takes up excessive intervals of time. Moreover, if a bookbinding machine is to process stacks of paper sheets or the like at a high or very high speed, the thickness of the adhesive layers which are applied to selected edge faces of the stacks is likely to change drastically because the rate of discharge of foamed adhesive per unit of time is constant.

Still further, the cost of the aforediscussed conventional apparatus is rather high because the act of dispersing an inert gas in adhesive can be a rather complex operation. Moreover, the rate of speed at which an inert gas can be caused to leave the liquid fraction of a foamed adhesive is rather low (up to one minute) which renders such types of apparatus useless in many types of modern bookbinding and other machines wherein the commodities must be processed at the rate of up to and in excess of thirty per minute. Thus, if the foamed adhesive contains an inert gas which was admitted into liquid adhesive at an elevated pressure, it takes up to one minute to ensure adequate segregation of gaseous fraction from the liquid fraction if such segregation is to take place at atmospheric pressure after the foam issues from the orifice of a spray nozzle.

OBJECTS AND SUMMARY OF THE INVENTION

An object of the invention is to provide a novel and improved apparatus which can form a foamed adhesive at the rate which is required in a modern high-speed machine, such as a bookbinding machine.

Another object of the invention is to provide an apparatus which is less likely to soil the conveyor and/or other parts of a bookbinding machine than the heretofore known apparatus.

A further object of the invention is to provide a relatively simple, compact and inexpensive but reliable and versatile apparatus for the application of adhesive to selected portions of discrete commodities, for example, to selected edge faces of stacked paper sheets in bookbinding and like machines.

An additional object of the invention is to provide an apparatus whose operation is just as reliable when the application of adhesive has to take place at a low or medium frequency as when the application takes place at high or extremely high frequencies.

Still another object of the invention is to provide an apparatus which can be installed or incorporated in existing bookbinding and like machines as a superior substitute for heretofore known apparatus.

An additional object of the invention is to provide a novel and improved method of processing adhesive between the interior of a paste tank and the selected portions of stacks of paper sheets in a bookbinding or like machine.

A further object of the invention is to provide an apparatus which can process the adhesive economically without any or with negligible waste and which ensures longer-lasting uninterrupted operation of the machine in which the application of adhesive takes place.

The invention is embodied in an apparatus for applying layers of adhesive to selected regions of successive commodities of a series of commodities, particularly for applying layers or films of adhesive to selected edge faces of stacks of paper sheets (e.g., groups of signatures) in a bookbinding machine. The apparatus comprises means for transporting successive commodities along a predetermined path, an adhesive-containing vessel adjacent a portion of and disposed below the path, a substantially wheel-shaped applicator having a peripheral surface including an upper portion which serves to apply layers or films of adhesive to successive commodities in the path and a second portion above the upper level of the supply of adhesive in the vessel, means for rotating the applicator in a direction such that the upper portion of the peripheral surface is located downstream of the second portion, as considered in the just mentioned direction, a spray nozzle which is adjacent to the second portion of the peripheral surface, a source of gaseous fluid (e.g., air or an inert gas), means for respectively supplying to the nozzle gaseous fluid from the source and adhesive from the vessel, and means for mixing the supplied fluid and adhesive ahead of the nozzle so that the latter sprays a mixture of fluid and adhesive onto the second portion of the peripheral surface of the applicator.

The transporting means can include an endless conveyor and pairs of cooperating gripping devices (e.g., claws or jaws) provided on the conveyor and serving to engage and advance discrete commodities.

The apparatus preferably further comprises photoelectric or other suitable means for regulating the upper level of the supply of adhesive in the vessel so that the location of application of the spray of adhesive to the second portion of the peripheral surface is invariably located above and a part at least of the lower portion of the peripheral surface is invariably located below such upper level.

The supplying means can comprise a conduit which has an intake end dipping into the supply of adhesive in the vessel and means (e.g., a suitable suction pump) for drawing gaseous fluid and adhesive into the conduit. The mixing means (e.g., a dynamic foam generator) is disposed downstream of the pump, as considered in the direction of flow of adhesive and gaseous fluid toward the nozzle. The source of gaseous fluid can include a pipe whose intake end is located outside of the supply of adhesive in the vessel and whose discharge end communicates with the conduit upstream of the mixing means. The mixing means and the pump can be immersed in the supply of adhesive in the vessel, and the discharge end of the aforementioned fluid-supplying pipe can be located upstream of the pump.

The nozzle is preferably formed with an elongated orifice (which can include one or more rows of smaller orifices) extending at least substantially across the full width of the second portion of the peripheral surface, as considered in the axial direction of the applicator.

The apparatus preferably further comprises means for regulating the thickness of the layer of intermixed adhesive and gaseous fluid on the peripheral surface of the applicator downstream of the nozzle and upstream of the location of application of adhesive to commodities in the aforementioned path. Such regulating means can comprise an intercepting doctor blade and means for moving the blade substantially radially of the applicator.

The aforementioned lower portion of the peripheral surface of the applicator preferably dips into the supply of adhesive in the vessel, and the apparatus preferably further comprises means for removing adhesive (if any) from the lower portion so that the second portion of the peripheral surface of the applicator is devoid of adhesive upstream of the nozzle. The removing means can comprise a second doctor blade whose edge is in contact with the peripheral surface of the applicator upstream of the nozzle and above the upper level of the supply of adhesive in the vessel.

The apparatus preferably also comprises means for heating the supply of adhesive in the vessel so that, if the lower portion of the peripheral surface of the applicator dips into the supply of adhesive in the vessel, the applicator and the heated adhesive exchange heat which obviates the need for separate heating means for the applicator. At least a portion of the mixing means and/or at least a portion of the supplying means can also exchange heat with the heated adhesive. For example, the major parts of the aforementioned conduit and pipe and the entire mixing means and pump can be immersed in the supply of adhesive.

The aforementioned thickness regulating means is preferably arranged to return the removed surplus of adhesive into the vessel.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
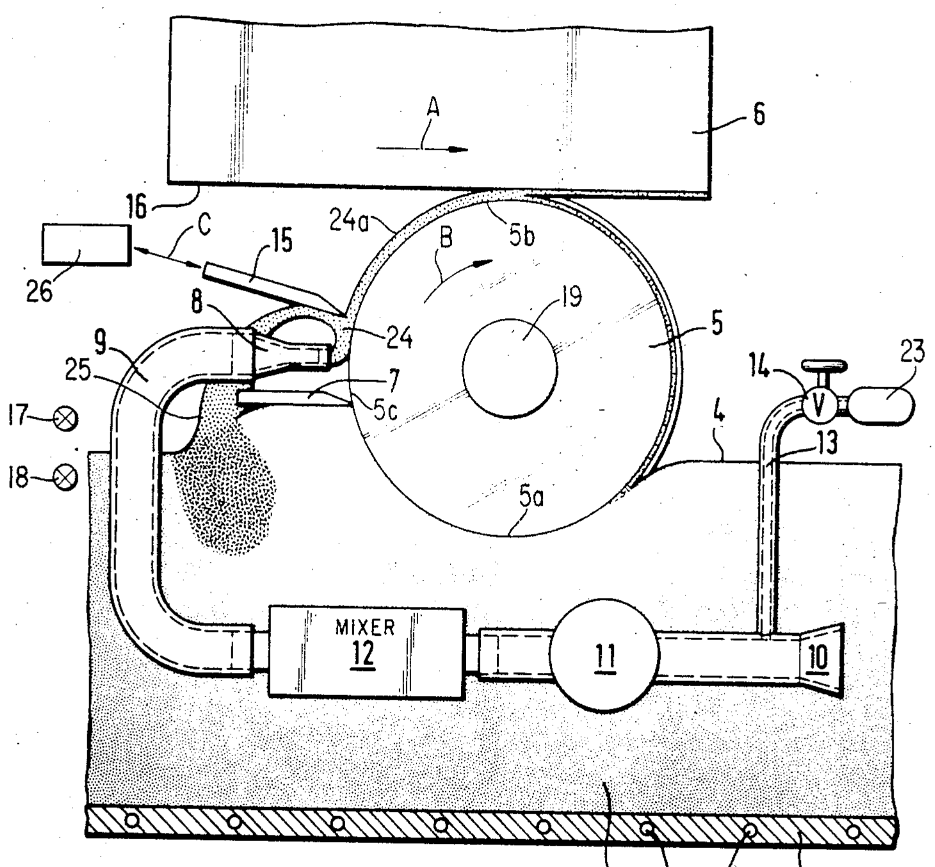
FIG. 1 is a schematic fragmentary longitudinal vertical sectional view of an apparatus which is installed in a bookbinding machine and embodies the present invention.
Figure 2:
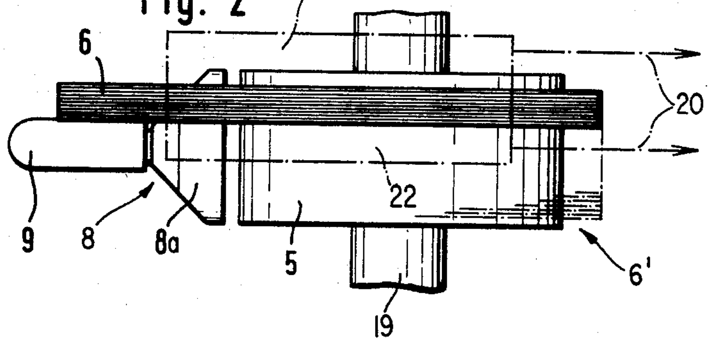
FIG. 2 is a fragmentary plan view of a portion of the apparatus which is shown in FIG. 1.

The apparatus of FIGS. 1 and 2 comprises a transporting unit which serves to advance a succession of preferably equidistant commodities 6 along a predetermined path, e.g., along a substantially horizontal path at a level above the rotary wheel-shaped applicator 5 of a paster further including a vessel 1, e.g., a conventional paste tank containing a supply 3 of adhesive paste. The wall or walls of the vessel 1 are heated by heating rods 2 which are embedded therein and maintain the temperature of the supply 3 of adhesive within a selected optimum range. The selected temperature of the supply 3 determines the viscosity of the confined bath of adhesive paste.

The upper level 4 of the supply 3 in the vessel 1 normally fluctuates within a certain range, namely between a maximum permissible level and a minimum permissible level. The means for regulating the quantity of the supply 3 of adhesive in the vessel 1, i.e., for regulating the upper level 4 of the supply 3, comprises an upper level detector 17 which transmits a signal when the level 4 rises to the maximum permissible value and a lower level detector 18 which transmits a signal when the level 4 descends to the minimum acceptable value. The detectors 17 and 18 may constitute or include photocells, and their signals control the circuit of a pump (not specifically shown) which delivers to the vessel 1 adhesive from a main source of supply, not shown.

The lower portion 5*a* of the peripheral surface of the applicator 5 (which is driven by its shaft 19 to rotate in a clockwise direction as indicated by the arrow B) preferably dips into the supply 3 of adhesive in the vessel 1, i.e., at least a part of the lower portion 5*a* is preferably located at a level below the level detector 18. The upper portion 5*b* of the peripheral surface of the applicator 5 serves to apply layers or films of adhesive to the lower edge faces 16 or backs of the stacks of paper sheets or the like which constitute the commodities 6. Such commodities are advanced to move in the direction which is indicated by the arrow A.

The peripheral surface of the applicator 5 further includes an intermediate portion 5*c* which is located downstream of the lower portion 5*a* (as considered in the direction of arrow B) and upstream of the upper portion 5*b*. The surface portion 5*c* is heated because the lower portion of the applicator 5 exchanges heat with the heated supply 3 of adhesive in the vessel 1; this renders it unnecessary to provide separate heating means for the rotary applicator 5.

A doctor blade 7 is installed adjacent to the second portion 5*c* of the peripheral surface of the applicator 5 at or slightly above the level of the upper level detector 17 to remove the adhesive which adheres to the lower portion 5*a* in the region where successive increments of such lower portion emerge from the supply 3. The edge of the doctor blade 7 is in continuous contact with or is immediately adjacent to the peripheral surface of the applicator 5 and serves to remove adhesive which is freshly withdrawn from the supply 3 by the applicator as well as adhesive which might not have been transferred from the upper portion 5*b* to the lower edge face 16 of a commodity 6 at the adhesive-applying station.

A spray nozzle 8 is adjacent to the portion 5*c* of the peripheral surface of the applicator 5 downstream of the blade 7 and has a divergent orifice 8*a* whose width at least approximates the width of the peripheral surface, as considered in the axial direction of the applicator 5 (see FIG. 2). This ensures highly predictable application of a layer of foamed adhesive to the peripheral surface all the way between the two end faces of the applicator 5.

The means for supplying to the nozzle 8 a gaseous fluid (e.g., air or an inert gas) and adhesive comprises a conduit 9 at least the major part of which dips into the supply 3 of adhesive in the vessel 1 and whose intake 10 is also immersed in the supply 3, a pipe 13 whose discharge end communicates with the conduit 9 in the interior of the vessel 1, and a means 11 (e.g., a suction pump) which draws adhesive via intake 10 and gaseous fluid via discharge end of the pipe 13. The intake end of the pipe 13 communicates with a source 23 of compressed gas, and the pipe 13 contains a combined regulating and shutoff valve 14 which determines the rate of admission of gaseous fluid into the conduit 9 upstream of the pump 11. The conduit 9 further contains a mixer 12 (e.g., a dynamic foam generator) which is disposed downstream of the pump 11 and converts the supplied adhesive and gaseous fluid into a mixture of finely atomized gaseous fluid and minute particles of adhesive so that the nozzle 8 receives a foamed medium whose gaseous fraction is free to rapidly escape into the surrounding atmosphere on leaving the orifice 8*a* and not later than immediately upon impingement of the spray of foamed adhesive upon the portion 5*c* of the peripheral surface of the applicator 5. The thus segregated liquid fraction (adhesive) forms on the peripheral surface of the applicator 5 an unequalized layer 24 which is advanced toward the lower edge face 16 of the oncoming commodity 6.

The intake 10 of the conduit 9 is located at a level below the lower detector 18 so that it is invariably immersed in the body of adhesive which forms the supply 3. This preferably also applies for the pump 11 and mixer 12 as well as for a portion of the pipe 13 to thus ensure that the temperature of adhesive which is supplied to the nozzle 8 does not drop below or is not appreciably below the optimum temperature selected by the heating rods 2. The mixer 12 may be a commercially available foam generator, e.g., of the type known as SMV which is manufactured and sold by Gebrüder Sulzer Aktiengesellschaft, Winterthur, Switzerland.

The improved apparatus further comprises a second doctor blade 15 which is disposed at a level above the orifice 8*a* of the nozzle 8 and serves to regulate the thickness of the equalized layer 24*a* that actually reaches the lower edge face 16 of the oncoming commodity 6. The means 26 for moving the blade 15 in the directions which are indicated by a double-headed arrow C can include a fluid-operated motor, an electromagnet, a rack and pinion drive or any other suitable means which is capable of moving the edge of the blade 15 substantially radially of the applicator 5 so that the blade 15 can return the surplus 25 of adhesive into the vessel 1. The moving means 26 can be adjusted automatically or by hand in dependency on the selected characteristics of the adhesive and/or in dependency on other parameters, such as the nature and thickness of covers which are to be bonded to the edge faces 16 of the commodities 6.

The transporting unit can comprise an endless chain or band conveyor 20 (indicated by two phantom lines which are shown in FIG. 2) and pairs of gripping devices 21, 22 (one pair shown in FIG. 2) which are affixed to the conveyor 20 and cooperate to grasp a commodity 6 therebetween for predictable transport through the adhesive-applying station above the upper portion 5*b* of the peripheral surface of the applicator 5. In the illustrated embodiment, the lower reach of the conveyor 20 is horizontal and the applicator 5 is disposed in a vertical plane, i.e., the axis of the shaft 19 is horizontal.

The mode of operation of the improved apparatus is as follows:

The conveyor 20 of the transporting unit is driven to advance successive pairs of gripping devices 21, 22 in the direction of arrow A, and the shaft 19 is also driven to rotate the applicator 5 in the direction of arrow B. The moving means 26 maintains the edge of the doctor blade 15 at a selected distance from the peripheral surface of the applicator 5 and the circuit of the heating rods 2 is completed so that the supply 3 of adhesive in the vessel 1 is maintained at an optimum temperature. The edge of the doctor blade 7 removes adhesive from the second portion 5*c* of the peripheral surface of the applicator 5 upstream of the orifice 8*a* of the nozzle 8, and the removed or intercepted adhesive is returned into the vessel 1. The regulating means including the level detectors 17 and 18 ensures that the upper level 4 of the supply 3 of adhesive in the vessel 1 does not rise above the maximum permissible or descend below the minimum acceptable value.

The motor for the pump 11 is on, the same as the motor for the mixer 12, and the setting of the valve 14 is such that it admits a predetermined quantity of gaseous fluid per unit of time, such fluid flowing into the conduit 9 upstream of the pump 11 so that the latter delivers the admitted gaseous fluid and the adhesive, which is drawn via intake 10, into the mixer 12. The mixer 12 atomizes the supplied gaseous fluid and the supplied adhesive and converts such fractions into a homogeneous foam which is admitted into the nozzle 8.

The orifice 8*a* of the nozzle 8 delivers the foam to the portion 5*c* of the peripheral surface of the applicator 5 where the liquid fraction forms a layer 24 normally containing a surplus 25 of adhesive. Such surplus is removed by the blade 15 so that the thickness of the equalized layer 24*a* downstream of the blade 15 is determined exclusively by the setting of the moving means 26. At least a certain portion of the layer 24*a* is applied to the selected (lower) edge faces 16 of successive commodities 6, and the remaining adhesive is returned into the vessel 1 where it is reheated and thus restored for admission into the conduit 9.

At least one gripping device of each pair of gripping devices 21, 22 is preferably movable in the axial direction of the applicator 5 so that such gripping devices can properly engage and transport relatively thin commodities (a thin commodity 6 is shown in FIG. 2 by solid lines) as well as medium thick or thick commodities (note the phantom lines 6' in FIG. 2). The thickness (axial length) of the applicator 5 is selected with a view to at least match the thickness of the thickest commodities which are to be supplied with adhesive in the improved apparatus. Any adhesive which is not applied to the edge face 16 of a commodity and does not become separated from the peripheral surface of the applicator 5 during passage through the upper stratum of the supply 3 in the vessel 1 is scraped off by the edge of the doctor blade 7 so that it cannot interfere with the application of a predictable layer of adhesive issuing from the orifice 8*a* of the nozzle 8.

An important advantage of the improved apparatus is that it can apply adhesive to successive commodities at a predictable rate irrespective of the speed of the gripping devices 21 and 22. This is due in part to the fact that the nozzle 8 receives a homogenous foam consisting of adhesive and gaseous fluid and its orifice 8*a* applies to the peripheral surface of the applicator a layer 24 whose thickness at least equals the minimum acceptable thickness of adhesive that is to contact the edge faces 16 of successive commodities in the path which is defined by the conveyor 20 of the transporting unit. Adequate heating of the conduit 9, mixer 12, pump 11, pipe 13 and applicator 5 by the supply 3 of adhesive in the vessel 1 also contributes to more predictable application of adhesive to successive commodities.

An advantage of the feature that the pipe 13 discharges into the conduit 9 ahead of the pump 11 is that the pressure in the conduit 9 between the pump 11 and the nozzle 8 does not appreciably exceed atmospheric pressure, i.e., the gaseous fluid (e.g., an inert gas which is stored at 23) need not be dissolved in the adhesive so that it can be rapidly separated from the adhesive as soon as it issues from the orifice 8*a*. This ensures that the machine can process the commodities 6 at a high frequency, such as 30 commodities per minute.

The improved apparatus is compact and rather inexpensive. It can be installed in many types of existing bookbinding machines as a superior substitute for presently employed adhesive applying apparatus including those disclosed in the aforementioned U.S. Pat. No. 4,059,714 and German Offenlegungsschrift No. 29 04 097. The uniformity of application of adhesive to selected portions of the commodities is surprisingly high and the quality of the adhesive is uniform because all of the previously applied adhesive is removed from the applicator 5 not later than at the station for the doctor blade 7.

One and the same nozzle 8 can be used irrespective of the width or thickness of the selected commodities because the non-applied adhesive which moves past the adhesive-applying station at the apex of the applicator 5 is simply returned into the vessel 1 and is invariably removed from the peripheral surface of the applicator 5 not later than at the location where such peripheral surface moves past the edge of the blade 7.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for applying layers of adhesive to selected regions of successive commodities of a series of commodities, particularly to edge faces of stacks of paper sheets in bookbinding machines, comprising means for transporting successive commodities along a predetermined path; an adhesive-containing vessel adjacent a portion of and below said path; a substantially wheel-shaped applicator having a peripheral surface including an upper portion arranged to apply layers of adhesive to the commodities in said path and a second portion above the upper level of adhesive in said vessel; means for rotating said applicator in a direction such that said upper portion is located downstream of said second portion, as considered in said direction; a spray nozzle adjacent to said second portion; a source of gaseous fluid; means for respectively supplying to said nozzle fluid from said source and adhesive from said vessel; and means for mixing the supplied fluid and adhesive ahead of said nozzle without appreciable dissolution of fluid in the adhesive so that the latter sprays a homogeneous foamy mixture of such fluid and adhesive onto the second portion of said surface.

2. The apparatus of claim 1, wherein the peripheral surface of said applicator includes a lower portion which dips into the supply of adhesive in said vessel and is located upstream of said second portion, as considered in said direction.

3. The apparatus of claim 2, wherein said transporting means includes an endless conveyor and pairs of cooperating gripping devices provided on said conveyor and arranged to engage and advance discrete commodities.

4. The apparatus of claim 2, further comprising means for regulating the upper level of the supply of adhesive in said vessel so that the location of application of the spray of adhesive to the second portion of said peripheral surface is invariably located above and a part at least of said lower portion is invariably located below such upper level.

5. The apparatus of claim 2, wherein said supplying means comprises a conduit which has an intake end in the supply of adhesive in said vessel and means for drawing fluid and adhesive into said conduit.

6. The apparatus of claim 5, wherein said mixing means is disposed downstream of said drawing means, as considered in the direction of flow of adhesive and fluid toward said nozzle.

7. The apparatus of claim 6, wherein said drawing means comprises a pump and said source includes a pipe having an intake end outside of the supply of adhesive in said vessel and a discharge end communicating with said conduit upstream of said mixing means.

8. The apparatus of claim 7, wherein said mixing means and said pump are at least partly immersed in the supply of adhesive in said vessel.

9. The apparatus of claim 7, wherein the discharge end of said pipe is located upstream of said pump.

10. The apparatus of claim 1, wherein said nozzle has an elongated orifice extending at least substantially across the full width of said second portion, as considered in the axial direction of said applicator.

11. The apparatus of claim 1, further comprising means for regulating the thickness of the adhesive containing layer on the peripheral surface of said applicator downstream of said nozzle and upstream of the location of application of adhesive to the commodities in said path.

12. The apparatus of claim 11, wherein said regulating means comprises an intercepting blade and means for moving said blade substantially radially of said applicator.

13. The apparatus of claim 1, wherein the peripheral surface of the applicator further includes a lower portion which is located upstream of said second portion, as considered in said direction, and further comprising means for removing adhesive, if any, from said lower portion so that said second portion is devoid of adhesive upstream of said nozzle.

14. The apparatus of claim 13, wherein the lower portion of said peripheral surface dips into the supply of adhesive in said vessel.

15. The apparatus of claim 13, wherein said removing means includes a blade having an edge in contact with the peripheral surface of said applicator upstream of said nozzle and above the upper level of the supply of adhesive in said vessel.

16. The apparatus of claim 1, further comprising means for heating the supply of adhesive in said vessel, the peripheral surface of said applicator further having a lower portion dipping into the supply of adhesive in said vessel upstream of said second portion, as considered in said direction, so that the applicator exchanges heat with the supply of adhesive.

17. The apparatus of claim 1, further comprising means for heating the supply of adhesive in said vessel, at least a portion of said mixing means being arranged to exchange heat with the supply of heated adhesive in said vessel.

18. The apparatus of claim 1, further comprising means for heating the supply of adhesive in said vessel, at least a portion of said supplying means being arranged to exchange heat with the supply of heated adhesive in said vessel.

19. The apparatus of claim 1, further comprising means for regulating the thickness of the adhesive containing layer on the peripheral surface of said applicator downstream of said nozzle and upstream of the location of application of adhesive to the commodities in said path, including means for returning the surplus of adhesive into said vessel.

* * * * *